(12) United States Patent
Nakamura

(10) Patent No.: US 6,434,227 B2
(45) Date of Patent: *Aug. 13, 2002

(54) EXCHANGE FOR PROVIDING SERVICE FUNCTIONS FOR GIVEN PERIODS OF TIME

(75) Inventor: Toshio Nakamura, Tokyo (JP)

(73) Assignee: NEC Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/834,836

(22) Filed: Apr. 10, 1997

(30) Foreign Application Priority Data

Apr. 12, 1996 (JP) .............................. 8-091144

(51) Int. Cl.[7] ................................................ H04M 3/42
(52) U.S. Cl. ......................... 379/207.03; 379/201.02; 379/201.03; 379/207.02
(58) Field of Search .................. 379/114, 128, 379/131, 139, 144, 188, 190, 192, 203, 201, 244, 247, 112, 130, 123

(56) References Cited

U.S. PATENT DOCUMENTS

| | | | | |
|---|---|---|---|---|
| 4,251,692 A | * | 2/1981 | Waldman .................... | 379/131 |
| 4,517,412 A | * | 5/1985 | Newkirk et al. ............ | 379/123 |
| 5,524,145 A | * | 6/1996 | Parker ........................ | 379/197 |
| 5,566,234 A | * | 10/1996 | Reed et al. ................. | 379/188 |
| 5,577,109 A | * | 11/1996 | Stimson et al. ............. | 379/112 |
| 5,602,906 A | * | 2/1997 | Phelps ........................ | 379/114 |
| 5,655,013 A | * | 8/1997 | Gainsboro .................. | 379/188 |
| 5,719,926 A | * | 2/1998 | Hill ............................. | 379/113 |
| 5,774,535 A | * | 6/1998 | Castro ........................ | 379/144 |
| 5,797,101 A | * | 8/1998 | Osmani et al. ............. | 455/551 |
| 5,802,157 A | * | 9/1998 | Clarke et al. ............... | 379/196 |
| 5,815,807 A | * | 9/1998 | Osmani et al. ............. | 455/410 |
| 5,875,236 A | * | 2/1999 | Jankowitz et al. .......... | 379/114 |
| 6,134,310 A | * | 10/2000 | Swan et al. ................. | 379/188 |

FOREIGN PATENT DOCUMENTS

| | | | |
|---|---|---|---|
| JP | 60152164 A | * | 8/1985 |
| JP | 60-152164 | | 8/1985 |
| JP | 4-54529 | | 2/1992 |
| JP | 4-77043 | | 3/1992 |
| JP | 4-253460 | | 9/1992 |
| JP | 6-85930 | | 3/1994 |
| JP | 6085930 A | * | 3/1994 |
| JP | 6-95871 | | 4/1994 |
| JP | 7-325713 | | 12/1995 |
| JP | 8-33018 | | 2/1996 |
| JP | 8-223292 | | 8/1996 |

* cited by examiner

*Primary Examiner*—Krista Zele
*Assistant Examiner*—Bing Bui
(74) *Attorney, Agent, or Firm*—Foley & Lardner

(57) ABSTRACT

A storage device has an operation effective value memory for storing operation start days, effective period deadlines, and number of effective days of service functions. A controller does not provide a service function when an extension telephone set is operated to use the service function if the present day is past an effective period deadline stored in the operation effective value memory.

10 Claims, 4 Drawing Sheets

FIG. 1

EXCHANGE FOR PROVIDING SERVICE FUNCTIONS FOR GIVEN PERIODS OF TIME

BACKGROUND OF THE INVENTION

1. Field of the Invention

The present invention relates to an exchange having a plurality of classified service functions which are available for respective given periods of time.

2. Description of the Related Art

There has heretofore been proposed an invention disclosed in Japanese Patent Laid-Open No. 20032/93 entitled "Method of loading configurational information into an information processing system" to prevent unauthorized use of a function or performance which is not permitted for the system to use. According to the disclosed method, after configurational information indicative of a permitted range of functions or performances is loaded into an information processing system, a load inhibit period is established to inhibit the loading of other configurational information for thereby preventing unauthorized use of a function or performance.

Japanese Patent Laid-Open No. 260839/94 discloses an invention entitled "Microcomputer" for shutting down a certain function for a given period of time to reduce a current consumed by a microcomputer. According to the disclosed invention, when a task NOP command is inputted, various function circuits involved to execute a task are shut down for a period of time not necessary to carry out a processing operation (memory reading) for thereby reducing current consumption.

One general technique for use with exchanges is a function to change services for a limited period of time everyday. Specifically, such a technique includes various processes for changing service functions in various time periods. For example, an extension is given connection control classes which differ from each other in daytime and night. In one connection control class, the exchange is allowed to transmit an outgoing call to a public network in day time. In another connection control class, the exchange is not allowed to transmit an outgoing call to the public network at night. According to another process, priority ranks for catching public network circuits for an outgoing call are changed depending on public network charges of calls which vary from time of day to time of day, for thereby saving call charges.

Conventional exchanges are arranged to perform a service function for a given period of time and do not automatically stop the service function after the period of time has elapsed. Therefore, when an exchange manufacturer sells an exchange to a user, it also sells the right to use a desired service function with the exchange to the user based on a contract for a desired period of time. After the desired period of time has elapsed, the exchange manufacturer sends an engineer to the user to make a software data change or a hardware modification in order to stop the service function that has elapsed.

SUMMARY OF THE INVENTION

It is therefore an object of the present invention to provide an exchange which is capable of automatically stopping a service function after a specified period of time in which the service function is performed has elapsed.

According to the present invention, there is provided an exchange having a plurality of classified service functions, comprising main switch means for accommodating a plurality of terminals, an operation effective value memory for storing an operation effective value representing an effective period deadline of a service function or the number of times that the service function can effectively be used, and control means for preventing the service function from being provided to the terminal or a terminal accommodated in another exchange through a line when the terminal is operated to use the service function, if the present period is past, or the number of times that the service function has been used exceeds, the operation effective value.

For operating a service function for a certain period of time, the service function automatically starts to be operated without human intervention. After an effectiveness deadline for the service function or the number of times that the service function has been used is in excess of the number of times that the service function can effectively be used, the exchange automatically shuts off the service function. Therefore, the expenditure of personnel expenses for operating the exchange can greatly be reduced. The above process makes it easy to sell the right to use service functions for a limited period of time. Since the right to use service functions for a limited period of time is sold, any service function, which would be expensive if the right to use it permanently were purchased, can be purchased inexpensively. After a user has purchased and operated the exchange with a relatively small initial fund, the user can decide whether the service function is effective or not and hence whether the investment for the service function is to be continued or interrupted. Therefore, the user finds it easy to purchase and operate the exchange.

The exchange may further include means for indicating to a serviceman of the exchange that the service function will not be provided if the present period is past, or the number of times that the service function has been used exceeds, the operation effective value.

The exchange may further include an advance warning memory for storing an advance warning day to warn beforehand a serviceman of the exchange or the terminal of the fact that the service function has expired and will not be provided, and warning means for warning the serviceman of the exchange or the terminal if the present day is past the advance warning day.

The exchange may further comprise means for indicating that the service function will not be provided to the terminal.

The exchange may further include means for notifying the terminal of the fact that the service function will be shut off when the terminal is operated to use the service function or thereafter uses the service function within a predetermined period of time prior to the effective period deadline.

The exchange may further comprise means for counting the number of times that the terminal has is operated to use the service function within a predetermined period of time after the effective period deadline, and means for displaying the counted number to a serviceman of the exchange.

The exchange may further include means for counting the number of times that the terminal has used the service function within a predetermined period of time before a shutdown of the service function is indicated or an advance notice of a shutdown of the service function is indicated, and means for indicating the counted number to a serviceman of the exchange.

Since the serviceman of the exchange or the user of the terminal which uses the service function knows beforehand that the service function will be shut off, the user can appropriately take an action to extend the term of a contract to use the service function without trouble.

The exchange may further include means for containing information on the number of effective days with respect to each service function, and indicating a failure of a clock device to a serviceman of the exchange when a decision made as to whether the service function is to be provided or not based on the effective period deadline and a decision made as to whether the service function is to be provided or not based on the number of effective days information contradict each other.

Inasmuch as a failure of the clock device which is installed in the exchange to provide clock information that is important to determine whether the operation effective value is exceeded or not, or a mistake or a willful false adjustment in setting up the clock device is detected and alarmed, the exchange is highly reliable for automatic shutdown.

According to the present invention, there is also provided an exchange having a plurality of classified service functions, comprising main switch means for accommodating a plurality of terminals, an operation effective value memory for storing an operation effective value representing an effective period deadline of a service function or the number of times that the service function can effectively be used, and control means for providing the service function to the terminal or a terminal accommodated in another exchange through a line when the terminal is operated to use the service function, and outputting an alarm, if the present period has elapsed, or the number of times that the service function has been used exceeds, the operation effective value.

The terminal can use a service function whose effective period has expired or which has been used a number of times in excess of the number of times that the service function can effectively be used. However, since an alarm is displayed for the serviceman each time the service function is going to be used, the serviceman is prompted to take an action to shut off the service function. Therefore, the above arrangement is analogous to an automatic shutdown process.

According to the present invention, there is further provided an exchange having a plurality of classified service functions, comprising main switch means for accommodating a plurality of terminals, a memory for storing an operation start day to start a service function, and control means for preventing the service function from being provided to the terminal or a terminal accommodated in another exchange through a line when the terminal is operated to use the service function, if the present day is prior to the operation start day.

The above and other objects, features, and advantages of the present invention will become apparent from the following description with reference to the accompanying drawings which illustrate examples of the present invention.

DETAILED DESCRIPTION OF THE PREFERRED EMBODIMENT

Figure 1:
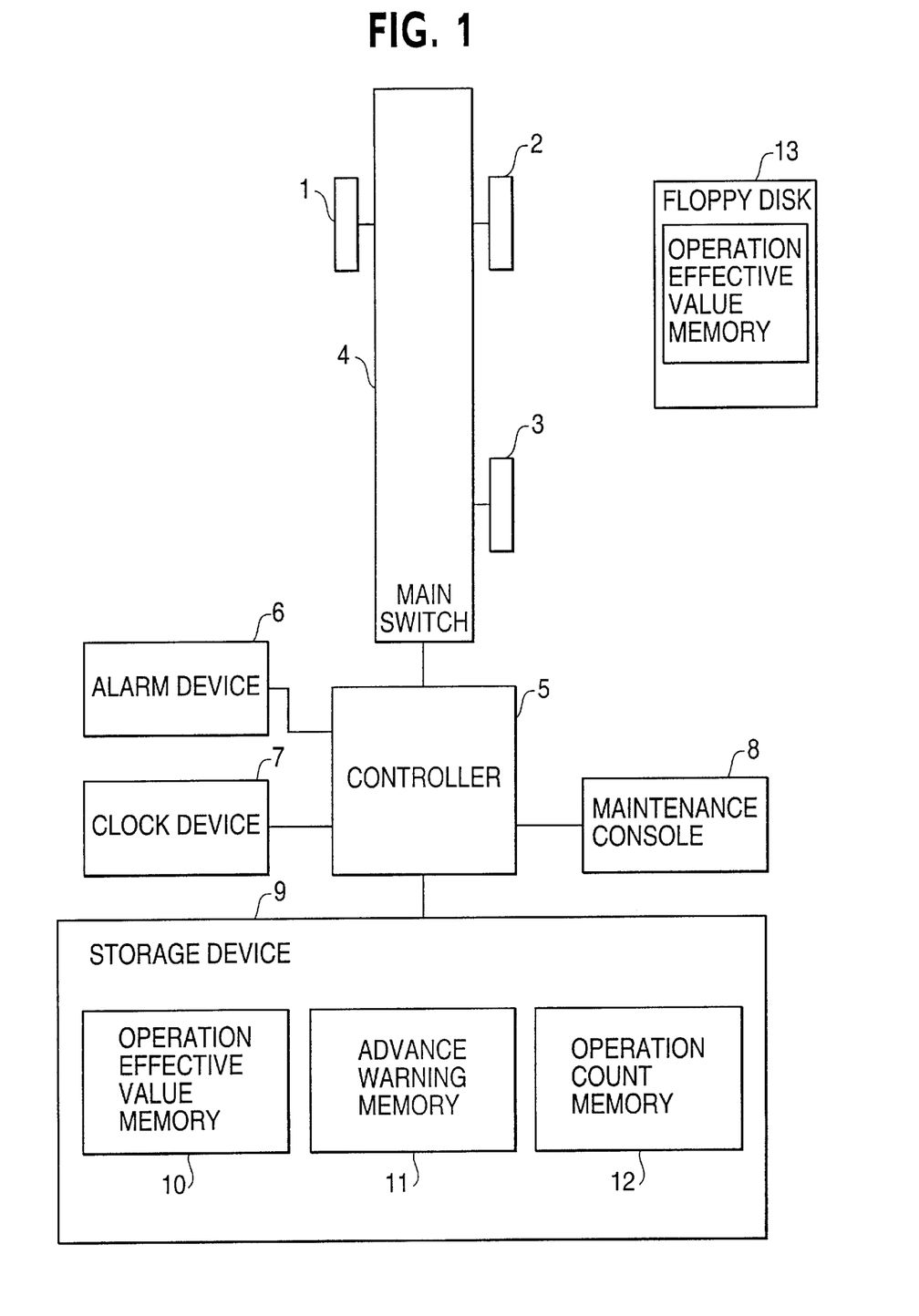
FIG. 1 is a block diagram of an exchange according to the present invention.

As shown in FIG. 1, an exchange according to the present invention comprises an extension telephone set 1, an operation shutdown advance-notice talkie device 2, an operation shutdown talkie device 3, a main switch 4, a controller 5, an alarm device 6, a clock device 7, a maintenance console 8, and a storage device 9. The extension telephone set 1, the operation shutdown advance-notice talkie device 2, and the operation shutdown talkie device 3 are connected to and accommodated by the main switch 4.

The main switch 4 is controlled by the controller 5 connected thereto to connect the extension telephone set 1 to the talkie devices 2, 3.

The controller 5 is operated by a program and data stored therein for controlling the main switch 4 based on dial information transmitted from the extension telephone set 1 to carry out exchange operations including connections, disconnections, etc. The controller 5 also monitors the exchange for system faults, and, in case of a system fault, controls the alarm device 6 to actuate a bell to generate an audible alarm or energize a lamp to generate a visible alarm.

The clock device 7 automatically updates information of years, months, days, hours, minutes, and seconds, and sends present time information to the controller 5. If the measured time gains or loses, the clock device 7 needs to be manually operated by the serviceman to adjust the information of years, months, days, hours, minutes, and seconds.

The maintenance console 8 prints various messages produced in the exchange in response to commands from the controller 5, and indicates the printed messages to the serviceman. The maintenance console 8 is also used by the serviceman when the serviceman gives the controller 5 an instruction to write information stored in a floppy disk 13 into the storage device 9.

The storage device 9 has an operation effective value memory 10, an advance warning memory 11, and an operation count memory 12. Information can be read from and written into these memories 10, 11, 12 by the controller 5.

Table 1, shown below, indicate items of information stored in the operation effective value memory 10. The operation effective value memory 10 stores operation start days, effective period deadlines, and number of effective days as information of service functions A, B, C which the exchange has. These items of information may already be stored in the operation effective value memory 10 when the exchange is shipped from the exchange manufacturer.

It is assumed in the illustrated embodiment that information stored in the floppy disk 13, which the user has purchased, is written into the operation effective value memory 10 by the serviceman using the maintenance console 8. The user has purchased the right to use the service function A from Jan. 1, 2000 to Dec. 31, 2000. Therefore, the floppy disk 13 stores "Dec. 31, 2000" as the effective period deadline, "Jan. 1, 2000" as the operation start day for the exchange, and "365 days" as the effective days. These items of information stored in the floppy disk 13 are written into the operation effective value memory 10.

TABLE 1

| Service function | Operation start day | Effective period deadline | Effective days |
|---|---|---|---|
| Service function A | January 1, 2000 | December 31, 2000 | 365 days |
| Service function B | | | days |
| Service function C | | | days |

Tables 2 and 3, shown below, indicate items of information stored in the advance warning memory 11 which are used to warn, in advance, the serviceman of the exchange and a terminal where the service functions are available of the fact that the service functions will be shut off because their periods expire. Table 2 shows stored information as to advance warning days on which the serviceman of the exchange is to be warned in advance. In Table 2, the first warning day for each of the service functions is stored under "Advance warning day 1", and the second warning day for each of the service functions is stored under "Advance warning day 2".

In this embodiment, Table 2 stores information for warning the serviceman of the exchange 60 days and 30 days before the service function A will be shut off.

Table 3 shows stored information as to advance warning days on which the terminal where the service functions are available is to be warned in advance. The advance warning memory 11 stores information as to advance warning days for the respective service functions A~C.

In this embodiment, Table 3 stores information for warning the terminal during a period from 10 days before the service function A will be shut off until the day on which the service function A will be shut off.

TABLE 2

| Service function | Advance warning day 1 | Advance warning day 2 |
|---|---|---|
| Service function A | 60 days before | 30 days before |
| Service function B | xx days before | xx days before |
| Service function C | xx days before | xx days before |

TABLE 3

| Service function | Advance warning day |
|---|---|
| Service function A | 10 days before |
| Service function B | xx days before |
| Service function C | xx days before |

Table 4, shown below, indicates items of information stored in the operation count memory 12. The operation count memory 12 serves to store the number of times that the terminal is operated to use each of the service functions in each day. In this embodiment, the operation count memory 12 stores the count of operations in each of present day, one day earlier, . . . , n days earlier with respect to each of the service functions A~C.

TABLE 4

| Service function | Present day | 1 day earlier | . . . | n days earlier |
|---|---|---|---|---|
| Service function A | xx times | xx times | . . . | xx times |
| Service function B | xx times | xx times | . . . | xx times |
| Service function C | xx times | xx times | . . . | xx times |

Figure 2:
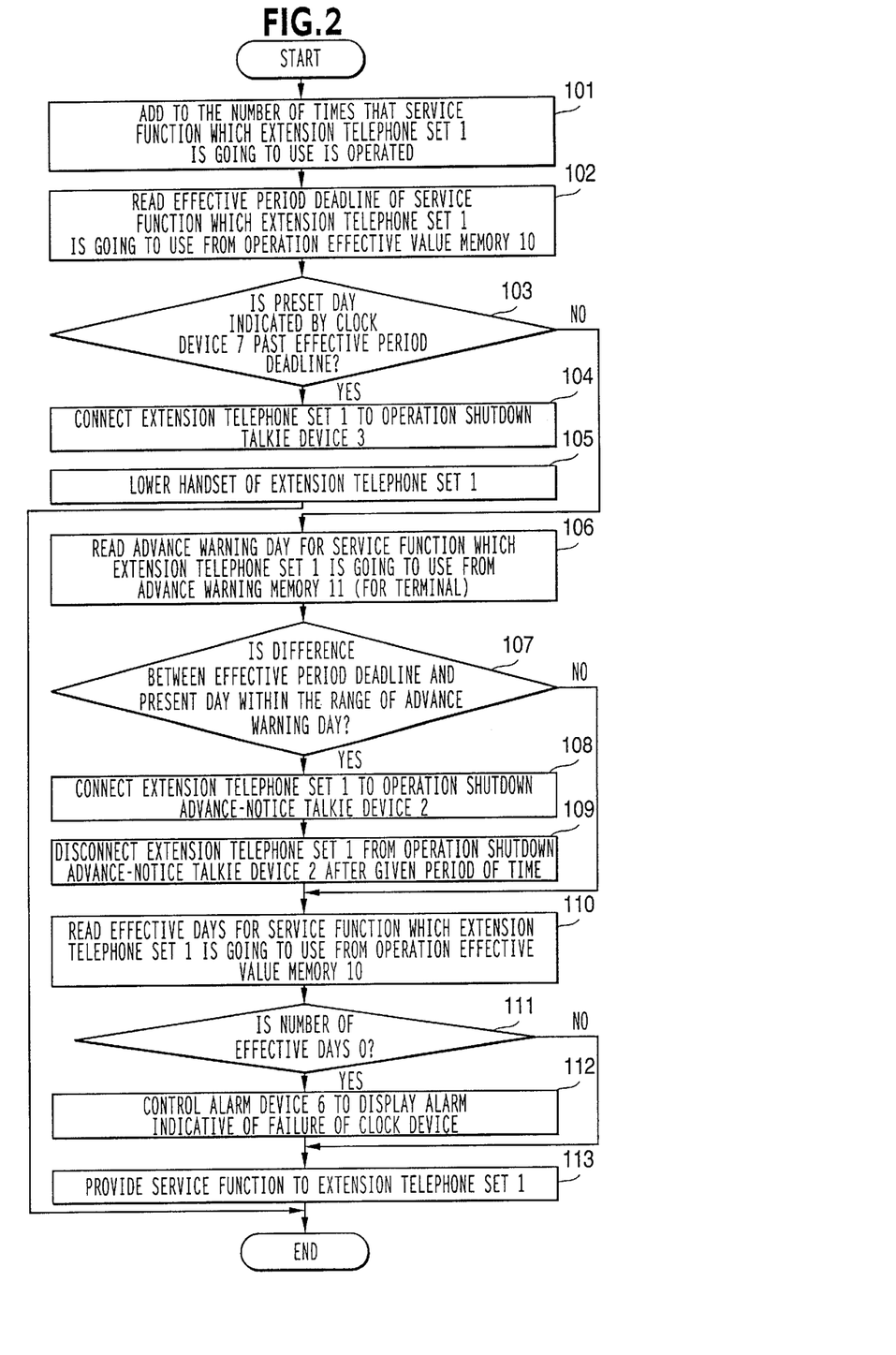
FIG. 2 is a flowchart of an operation sequence of the exchange when an extension telephone set is operated to use a service function with the exchange.

FIG. 2 shows an operation sequence of the exchange when the handset of the extension telephone set 1 is lifted off the hook while the extension telephone set 1 is in a nonuse condition and the extension telephone set 1 is dialed to use the service function A.

In FIG. 2, when the handset of the extension telephone set 1 is lifted off the hook while the extension telephone set 1 is in a nonuse condition and the extension telephone set 1 is dialed to use the service function A, the controller 5 receives the dial information from the extension telephone set 1, and adds to the count information for the present day in the operation count memory 12 with respect to the service function A which the extension telephone set 1 is going to use, thereby calculating the operation count in a step 101. Then, the controller 5 reads the effective period deadline information "Dec. 31, 2000" for the service function A which the extension telephone set 1 is going to use from the operation effective value memory 10 in a step 102. The controller 5 compares the effective period deadline information thus read with the present date indicated by the clock device 7 in a step 103. If the present date is past the effectiveness deadline, then the controller 5 issues a control command to the main switch 4 to connect the extension telephone set 1 and the operation shutdown talkie device 3 to each other in a step 104, indicating to the extension telephone set 1 that the service function A is being shut off. When it is indicated that the service function A is being shut off, the handset of the extension telephone set 1 is lowered in a step 105, and then the operation sequence is finished.

If the present date is not past the effective period deadline in the step 103, then the controller 5 reads the advance warning day information "10 days before" for the service function A which the extension telephone set 1 is going to use from the advance warning memory 11 (for the terminal) in a step 106. The controller 5 calculates the difference between the effective period deadline information read from the operation effective value memory 10 in the step 102 and the present date indicated by the clock device 7, and determines whether the difference falls as the advance warning day in the range of "10 days before" in a step 107. If the difference falls in the range of "10 days before", then the controller 5 connects the extension telephone set 1 and the operation shutdown advance-notice talkie device 2 to each other in a step 108, and, after elapse of a certain period of time, disconnects the extension telephone set 1 and the operation shutdown advance-notice talkie device 2 from each other, supplying the extension telephone set 1 with audible information indicating that the shutdown of the service function A is approaching, in a step 109. Then, the controller 5 reads the effective day information with respect to the service function A which the extension telephone set 1 is going to use from the operation effective value memory 10 in a step 110, and determines whether the effective day information represents 0 (zero) day or not in a step 111. If the effective day information represents 0 day, then since 0 day is reached regardless of the fact that the present date is not past the effective period deadline, the controller 5 decides that the clock device 7 suffers a failure or an adjustment mistake caused by the serviceman, and controls the alarm device 6 to display an alarm indicative of a failure of the clock device 7 in a step 112. The controller 5 then provides the service function A to the extension telephone set 1 in a step 113.

Figure 3:
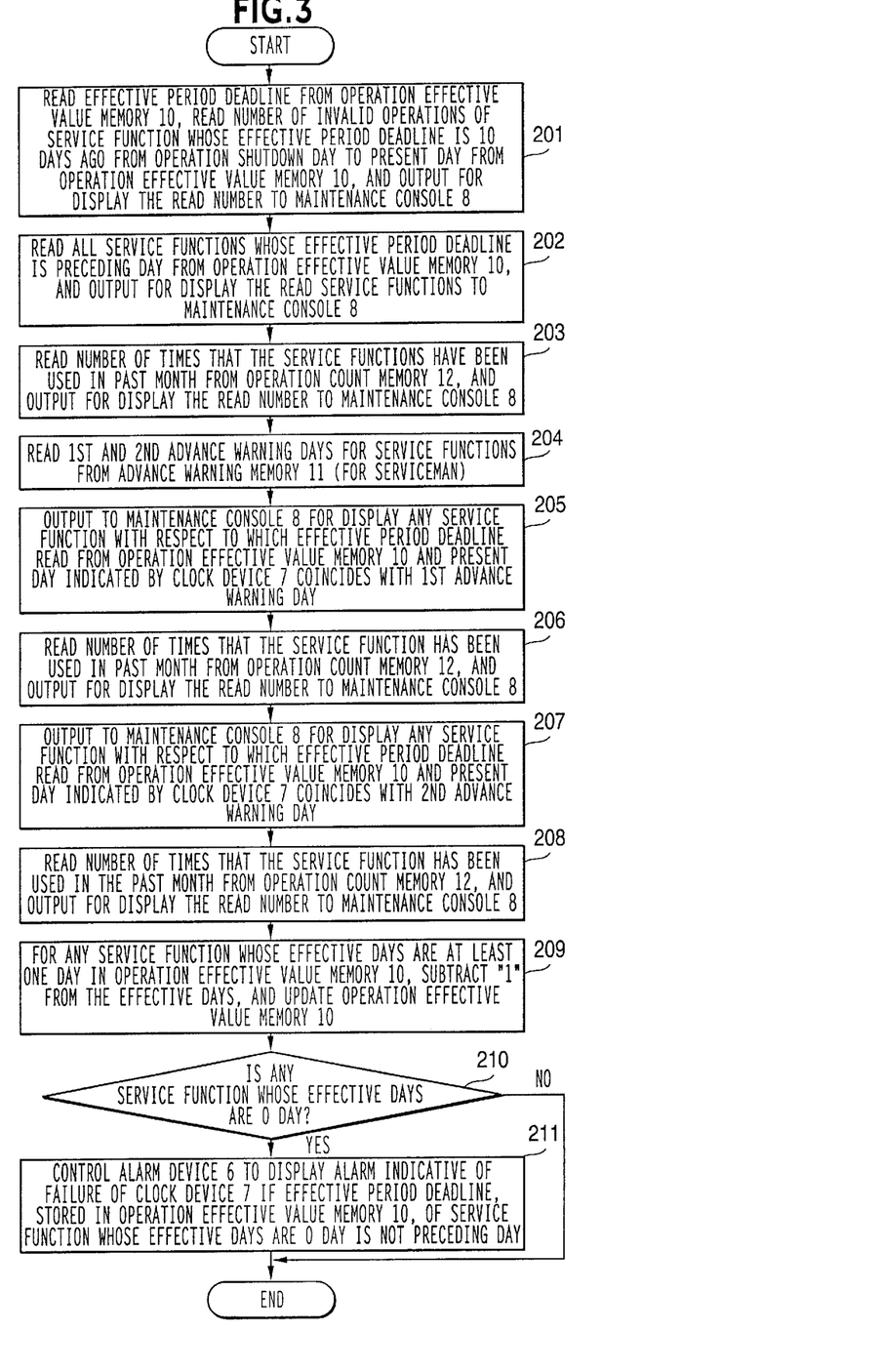
FIG. 3 is a flowchart of a control sequence which is periodically carried out in the exchange.

FIG. 3 shows a control sequence which is periodically carried out in the exchange by the controller 5 once a day.

First, the controller 5 reads the effective period deadline for each of the available service functions from the operation effective value memory 10, reads the number of invalid operations of the terminal from an operation shutdown day to the present day with respect to any service function whose effective period deadline was 10 days ago, from the operation count memory 12, i.e., the information from 10 days ago to the present day as shown in Table 4 from the operation count memory 12, and outputs for display the read number to the maintenance console 8 in a step 201. The serviceman can use the displayed information as a basis for determining whether the right to use the service function which has already expired is to be newly purchased or not.

Then, the controller 5 reads all service functions whose effective period deadlines were the preceding day from the operation effective value memory 10, and outputs for display the read information as a shutdown warning to the maintenance console 8 in a step 202. The maintenance console 8 displays the information in order to let the serviceman know that those service functions have been shut off. Thereafter, the controller 5 calculates the number of times that the service functions, with respect to which the shutdown warning has been displayed, have been used in the past month, from the information stored in the operation count memory 12, and outputs for display the calculated number to the maintenance console 8 in a step 203. The maintenance console 8 displays the calculated number. Based on the displayed information, the serviceman is aware of those service functions which have expired, and thus obtains a basis for determining whether the right to use the service functions which have already expired is to be newly purchased or not.

Thereafter, the controller 5 reads the first and second advance warning days for each of the service functions from the advance warning memory 11 (for the serviceman) in a step 204. The controller 5 reads the effective period deadlines for the respective service functions from the operation effective value memory 10, calculates the differences between those effective period deadlines and the present date indicated by the clock device 7, and, if there is a service function with respect to which the calculated difference coincides with the first advance warning day, outputs for display a first advance warning to the maintenance console 8 in a step 205. The maintenance console 8 displays the first advance warning in order to let the serviceman know that the service function will soon be shut off. The controller 5 also calculates the number of times that the service function, with respect to which the first advance warning has been displayed, has been used in the past month, from the information stored in the operation count memory 12, and outputs for display the calculated number to the maintenance console 8 in a step 206. The maintenance console 8 also displays the number. Based on the displayed information, the serviceman is able to know service functions which will soon expire, and hence a basis for determining whether the right to use those service functions is to be purchased again or not. If necessary, the right to use those service functions can be purchased again for continued use.

Similarly, the controller 5 reads the effective period deadlines for the respective service functions from the operation effective value memory 10, calculates the differences between those effectiveness deadlines and the present date indicated by the clock device 7, and, if there is a service function with respect to which the calculated difference coincides with the second advance warning day, outputs for display a second advance warning to the maintenance console 8 in a step 207. The maintenance console 8 displays the second advance warning in order to let the serviceman know that the service function will soon be shut off. The controller 5 also calculates the number of times that the service function, with respect to which the second advance warning has been displayed, has been used in the past month, from the information stored in the operation count memory 12, and outputs for display the calculated number to the maintenance console 8 in a step 208. The maintenance console 8 also displays the number. The first and second advance warning days to display the first and second advance warnings are selected and stored beforehand in the advance warning memory 11 in view of days to be reserved for the serviceman to establish a fund and follow a procedure to purchase again the right to use the service function for continued use.

Thereafter, if there is a service function whose effective day information stored in the operation effective value memory 10 represents 0 (zero) day, then the controller 5 does not effect any processing. If there is a service function whose number of effective days information stored in the operation effective value memory 10 represents one or more days, then the controller 5 subtracts "1" from the effective day information, and updates the operation effective value memory 10 in a step 209. Then, the controller 5 determines whether there is a service function whose number of effective days information stored in the operation effective value memory 10 represents 0 (zero) day or not in a step 210.

If there is a service function whose effective days information stored in the operation effective value memory 10 represents 0 (zero) day, then the controller 5 reads the effective period deadline corresponding to the service function from the operation effective value memory 10. If the effective period deadline does not indicate the preceding day, then since the effective days are 0 (zero) regardless of the fact that the present date is not past the effective period deadline, the controller 5 decides that the clock device 7 suffers a failure or an adjustment mistake caused by the serviceman, and controls the alarm device 6 to display an alarm indicative of a failure of the clock device 7 in a step 211.

Figure 4:
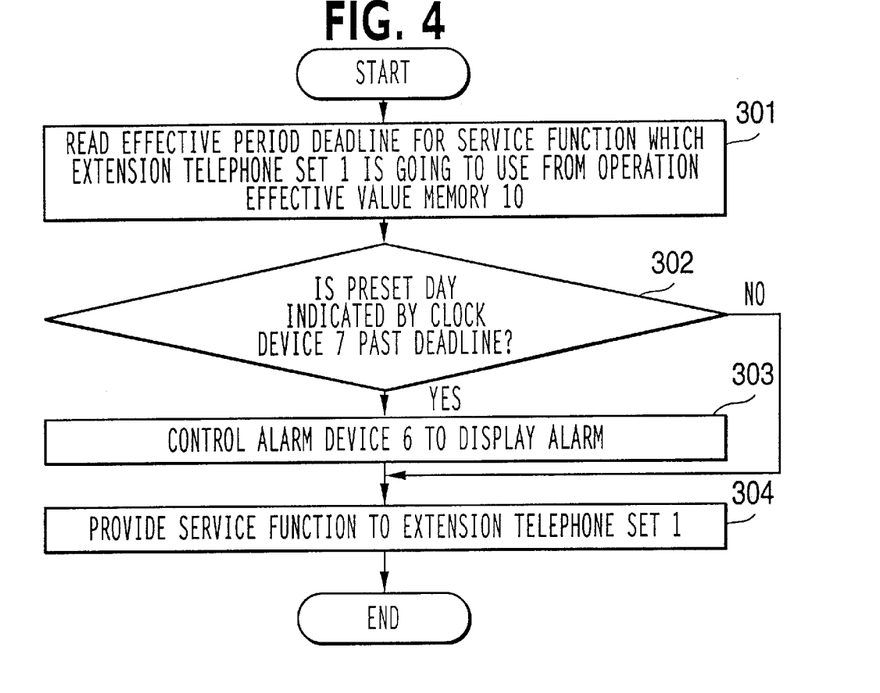
FIG. 4 is a flowchart of another operation sequence of the exchange when the extension telephone set is operated to use a service function with the exchange.

FIG. 4 shows another operation sequence of the exchange when the handset of the extension telephone set 1 is lifted off the hook while the extension telephone set 1 is in nonuse condition and the extension telephone set 1 is dialed to use the service function A.

In FIG. 4, when the handset of the extension telephone set 1 is lifted off the hook while the extension telephone set 1 is in nonuse condition and the extension telephone set 1 is dialed to use the service function A, the controller 5 reads the effective period deadline information "Dec. 31, 2000" for the service function A which the extension telephone set 1 is going to use from the operation effective value memory 10 in a step 301. The controller 5 compares the effective period deadline information thus read with the present date indicated by the clock device 7 in a step 302. If the present date is not past the effective period deadline, then the controller 5 provides the service function A to the extension telephone set 1 in a step 304. If the present date is past the effective period deadline, then the controller 5 controls the alarm device 6 to display an alarm in a step 303. Thereafter, the controller 5 provides the service function A to the extension telephone set 1 in the step 304.

In the operation sequence shown in FIG. 4, the extension telephone set 1 is allowed to use the service function A which has expired. However, since the alarm device 6 displays an alarm for the serviceman each time the service function A is going to be used, the serviceman is prompted to take an action to shut off the service function A. Therefore, the operation sequence shown in FIG. 4 is analogous to an automatic shutdown process.

Figure 5:
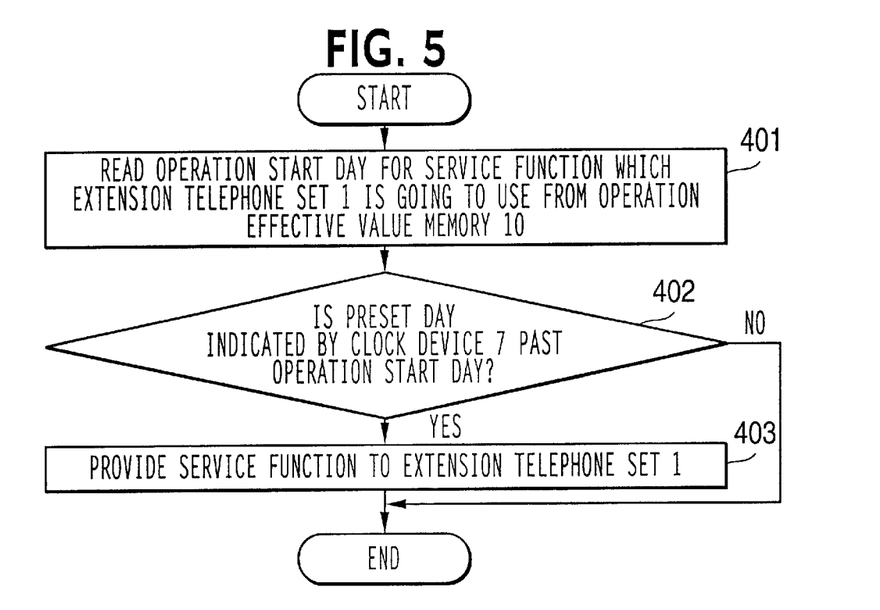
FIG. 5 is a flowchart of still another operation sequence of the exchange when the extension telephone set is operated to use a service function with the exchange.

FIG. 5 shows still another operation sequence of the exchange when the handset of the extension telephone set 1 is lifted off the hook while the extension telephone set 1 is in nonuse condition and the extension telephone set 1 is dialed to use the service function A.

In FIG. 5, when the handset of the extension telephone set 1 is lifted off the hook while the extension telephone set 1 is in nonuse condition and the extension telephone set 1 is dialed to use the service function A, the controller 5 reads the operation start day information "Jan. 1, 2000" for the service function A which the extension telephone set 1 is going to use from the operation effective value memory 10 in a step 401. The controller 5 compares the operation start day information thus read with the present date indicated by the clock device 7 in a step 402. If the present date is not past the operation start day, then the controller 5 does not provide the service function A to the extension telephone set 1. If the present date is past the operation start day, then the controller 5 provides the service function A to the extension telephone set 1 in a step 403.

In the illustrated embodiments, the effective period deadline information stored in the operation effective value memory 10 represents effective period deadline values indicated by years, months, and days. However, the effective period deadline information may represent number of effective days values indicated by days, effective month values indicated by months, or effective year values indicated by years. Alternatively, the effective period deadline information may represent effective use count values indicated by the numbers of times that service functions can be used.

In the illustrated embodiments, when a terminal, i.e., the extension telephone set 1, accommodated in the exchange is operated to use a service function which has been shut off, the terminal is notified of the fact that the service function is being shut off by the talkie device. However, if the terminal is capable of displaying characters, then it may be notified of the fact that the service function is being shut off by displayed characters. This holds true even when the service which uses the service function is accommodated in another exchange through a line. The terminal may be notified beforehand of the fact that the service function is going to be shut off, by displayed characters.

In the illustrated embodiments, information stored in the floppy disk 3 purchased by the user is written into the operation effective value memory 10 by the serviceman through the maintenance console 8. However, information may be written into the operation effective value memory 10 when the exchange is shipped from the exchange manufacturer or when the exchange is installed. Alternatively, if the exchange can remotely be serviceable by the exchange manufacturer, information may be written into the operation effective value memory 10 remotely from the exchange manufacturer.

If the exchange can remotely be serviceable by the exchange manufacturer, the operation effective value memory 10 may be installed in a host computer installed at a remote maintenance facility of the exchange manufacturer, rather than in the exchange, and data for the exchange may remotely be modified by the host computer for automatically shutting off service functions which have been used by the exchange.

In the illustrated embodiments, the advance warning days are stored in the advance warning memory 11 for displaying advance warnings for the serviceman. However, the controller 5 may be programmed to display advance warnings at fixed intervals, e.g., every month or every other month.

Although the extension telephone set 1 is accomodated in the main switch 4 in the illustrated embodiments, the extension telephone set 1 may be accommodated in another main switch through a line.

While preferred embodiments of the present invention have been described using specific terms, such description is for illustrative purposes only, and it is to be understood that changes and variations may be made without departing from the spirit or scope of the following claims.

What is claimed is:

1. An exchange having a plurality of classified service functions, comprising:
   a main switch means for accommodating a plurality of terminals each terminal having an extension telephone operable without a calling card;
   an operation effective value memory for storing an operation effective value representing an effective period deadline of a service function or the number of times that the service function can effectively be used; and
   a control device for preventing the service function from being provided to one of said plurality of terminals if the effective period deadline is past, or the number of times that the service function has been used exceeds said operation effective value, said period deadline including a date after which said service function will be prevented, said service function being other than a connection of a pre-paid call;
   an advance warning memory for storing an advance warning day to warn a service person of the exchange or said one of said plurality of terminals of the fact that the service function will expire; and
   a warning device for warning said service person of the exchange or said one of said plurality of terminals if the present day is past said advance warning day;
   wherein said control device is operative without requiring a security code or authorization code to be input by a user of said one of said plurality of terminals.

2. An exchange according to claim 1, further comprising:
   means for indicating to a service person of the exchange that the service function will not be provided if the effective period deadline is past, or the number of times that the service function has been used exceeds said operation effective value.

3. An exchange according to claim 1, further comprising:
   means for indicating that the service function will not be provided to said one of said plurality of terminals.

4. An exchange according to claim 1, further comprising:
   means for notifying said one of said plurality of terminals of the fact that the service function will be shut off when the terminal is operated to use the service function or thereafter uses the service function within a predetermined period of time prior to said effective period deadline.

5. An exchange according to claim 3 or 4, further comprising:

means for counting the number of times that said one of said plurality of terminals has used the service function within a predetermined period of time before a shutdown of the service function is indicated or an advance notice of a shutdown of the service function is indicated; and means of indicating the counted number to a service person of the exchange.

6. An exchange according to claim 4, further comprising:

means for counting the number of times that said one of said plurality of terminals has used the service function within a predetermined period of time before a shutdown of the service function is indicated or an advance notice of a shutdown of the service function is indicated; and means for indicating the counted number to a serviceman of the exchange.

7. An exchange according to claim 1, further comprising:

means for counting the number of times that said one of said plurality of terminals is operated to use the service function within a predetermined period of time after said effective period deadline; and means for displaying the counted number for a service person of the exchange.

8. An exchange having a plurality of classified service functions, comprising:

a main switch for accommodating a plurality of terminals;

an operation effective value memory for storing an operation effective value representing an effective period deadline of a service function or the number of times that the service function can effectively be used; and a control device for preventing the service function from being provided to said one of said plurality of terminals if the effective period deadline is past, or the number of times that the service function has been used exceeds, said operation effective value; said exchange further comprising:

means for storing information representing a number of effective days a service function is to be effective, and indicating a failure of a clock device to a service person of the exchange when a decision made as to whether the service function is to be provided or not based on the effective period deadline and a decision made as to whether the service function is to be provided or not based on the number of effective days information contradict each other.

9. An exchange having a plurality of classified service functions, comprising:

a main switch for accommodating a plurality of terminals each terminal having an extension telephone operable without a calling card;

an operation effective value memory for storing an operation effective value representing an effective period deadline of a service function or the number of times that the service function can effectively be used; and a control device for providing the service function to the one of said plurality of terminals and outputting an alarm, if the effective period deadline has elapsed, or the number of times that the service function has been used exceeds said operation effective value, said period deadline including a date after which said service function will be prevented, said service function being other than a connection of a pre-paid call;

an advance warning memory for storing an advance warning day to warn a service person of the exchange or said one of said plurality of terminals of the fact that the service function will expire; and a warning device for warning said service person of the exchange or said one of said plurality of terminals if the present day is past said advance warning day;

wherein said control device is operative without requiring a security code or authorization code to be input by a user of said one of said plurality of terminals.

10. An exchange having a plurality of classified service functions, comprising:

a main switch for accommodating a plurality of terminals each terminal having an extension telephone without a calling card;

a memory for storing an operation start day to start a service function; and a control device for preventing the service function from being provided to one of said plurality of terminals if the present day is prior to said operation start day, said service function being other than a connection of a pre-paid call;

an advance warning memory for storing an advance warning day to warn a service person of the exchange or said one of said plurality of terminals of the fact that the service function will expire; and a warning device for warning said service person of the exchange or said one of said plurality of terminals if the present day is past said advance warning day;

wherein said control device is operative without requiring a security code or authorization code to be input by a user of said one of said plurality of terminals.

* * * * *